(No Model.)
J. DU SHANE.
CURRY COMB.
No. 455,182. Patented June 30, 1891.
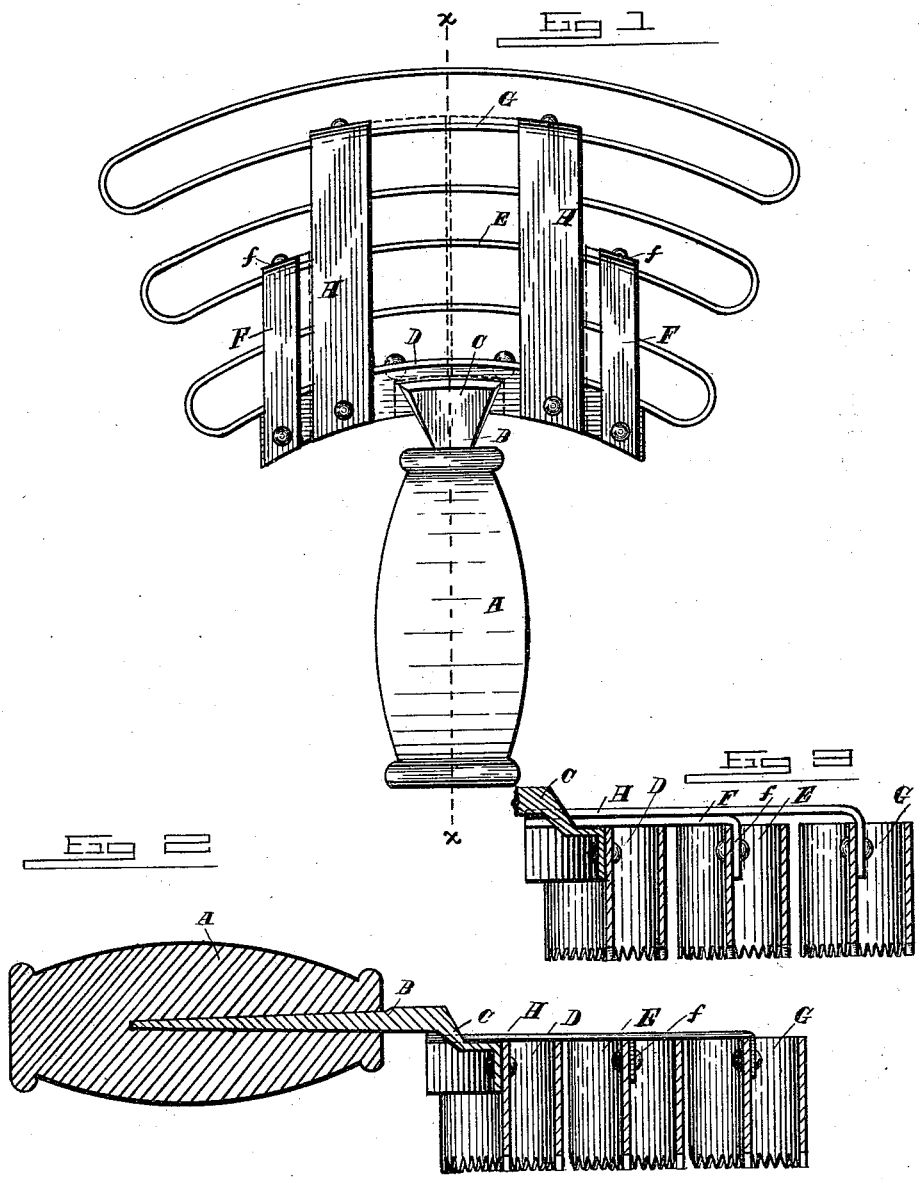

UNITED STATES PATENT OFFICE.

JAMES DU SHANE, OF SOUTH BEND, INDIANA.

CURRY-COMB.

SPECIFICATION forming part of Letters Patent No. 455,182, dated June 30, 1891.

Application filed January 7, 1890. Serial No. 336,188. (No model.)

*To all whom it may concern:*

Be it known that I, JAMES DU SHANE, of South Bend, in the county of St. Joseph and State of Indiana, have invented certain new and useful Improvements in Curry-Combs; and I do hereby declare that the following is a full, clear, and exact description thereof, reference being had to the accompanying drawings, and to the letters of reference marked thereon, which form part of this specification, in which—

Figure 1 is a plan view of my improved curry-comb. Fig. 2 is a sectional view thereof on line $x\ x$, Fig. 1. Fig. 3 is a detail sectional view illustrating a modification.

This invention is an improvement in curry-combs, and its object is to make a comb the teeth of which will be sufficiently rigid, but will yield to pressure and can vibrate freely, so as to be self-cleaning, and which requires no rigid backing; and it consists, essentially, of a series of loops or sections formed of strips of metal serrated on their lower edges and preferably bent into oval form, such ovals being arranged side by side and each connected to the handle independently, all of which will be clearly understood from the following description and claims.

Referring to the drawings by letters, A designates the handle, B a shank attached thereto, having a cross-head C, preferably angular in cross-section and curved on the arc of a circle, as indicated. D designates a loop formed of a strip or ribbon of metal, preferably steel, serrated on its lower edge and bent into an oval form, the longest sides of which are parallel and preferably made on the arcs of concentric circles, as indicated, and the inner side of said loop or section is connected direct to the head C of the shank, or in other convenient manner to the handle, so as to be supported thereby, leaving its outer portion preferably free to vibrate and yield when passing over inequalities of the hide of the animal.

E designates a loop-section similar to loop D and laid parallel therewith, and F F designate metallic spring-strips attached to head C or handle at one end and projecting over and beyond loop D, and having their front ends connected to loop E, being preferably bent down and riveted to the side thereof, as at $f$, or otherwise secured thereto, to sustain loop E similarly to loop C and independently thereof. G designates another similar section or loop lying parallel with loop E, and H H are strips connected to the head C or handle and overlying loops D and E, and attached to and supporting loop G, similarly to the supports of loop E. The strips F and H are preferably made of spring metal. These combing loops or sections of the comb are thus independently spring-supported and connected to the handle, and each is free to vibrate and thereby keep itself clean, and not to be harsh to the hide of the animal, however tender it may be. Two or more of such sections may be used, as is obvious, according to the size of comb desired. By making the strips F and H sufficiently broad, as indicated in dotted lines in Fig. 1, they will serve as a backing to the comb, and by making them flat they will hold the loops so that they cannot be distorted by side pressure, and at the same time allow them to move vertically, as the inequalities of the hide demand. Instead of placing strips F and H side by side, they might be placed one above the other, as shown in Fig. 3.

Having described my invention, what I claim as new, and desire to secure by Letters Patent thereon, is—

The combination, in a curry-comb, of a series of loops formed of ribbon or strip metal serrated on one edge, said loops arranged side by side, but not in contact, a handle having a headed shank to which the first loop is connected direct by one side, flat strips attached to the headed shank and to the second strip at one side only, and similar strips similarly connecting the other loops to the head of the shank, as and for the purpose specified.

In testimony that I claim the foregoing as my own I affix my signature in presence of two witnesses.

JAMES DU SHANE.

Witnesses:
 JEANIE ANDERSON,
 WILLIS A. BUGBEE.